United States Patent [19]

Meade, Jr.

[11] Patent Number: 5,615,514
[45] Date of Patent: Apr. 1, 1997

[54] ANIMAL TRAP

[75] Inventor: Joseph F. Meade, Jr., Hammondsport, N.Y.

[73] Assignee: Mercury Aircraft, Inc., Hammondsport, N.Y.

[21] Appl. No.: 536,093

[22] Filed: Sep. 29, 1995

[51] Int. Cl.[6] ................................................. A01M 23/20
[52] U.S. Cl. ....................................... 43/61; 43/67
[58] Field of Search .................................. 43/60, 61, 62, 43/63, 64, 67

[56] References Cited

U.S. PATENT DOCUMENTS

| | | | |
|---|---|---|---|
| 1,307,763 | 6/1919 | Sterbenz | 43/61 |
| 1,407,909 | 2/1922 | Wyskwarko | 43/61 |
| 1,650,458 | 11/1927 | McDonald | 43/62 |
| 1,759,048 | 5/1930 | Fisher | 43/61 |
| 1,892,423 | 12/1932 | D'Amato . | |
| 2,155,544 | 4/1939 | Harlow . | |
| 2,181,551 | 11/1939 | Haydan . | |
| 2,478,605 | 8/1949 | Symens . | |
| 2,524,504 | 10/1950 | Woolworth . | |
| 2,541,681 | 2/1951 | Andrews . | |
| 2,551,903 | 5/1951 | Roberts . | |
| 2,608,019 | 8/1952 | Smith | 43/61 |
| 3,113,395 | 12/1963 | Van Kuren . | |
| 4,080,749 | 3/1978 | Gilbaugh | 43/61 |
| 4,159,590 | 7/1979 | Palfalvy . | |
| 4,162,588 | 7/1979 | Wyant . | |
| 4,310,984 | 1/1982 | Brubaker | 43/61 |
| 4,583,317 | 4/1986 | Beard | 43/61 |
| 4,703,582 | 11/1987 | DeSena . | |
| 4,829,701 | 5/1989 | ImBrogno . | |
| 4,899,484 | 2/1990 | Morin . | |
| 4,912,872 | 4/1990 | Wynn et al. . | |
| 5,148,625 | 9/1992 | Saleman | 43/67 |
| 5,199,210 | 4/1993 | Nastas . | |
| 5,235,779 | 8/1993 | Saleman | 43/67 |
| 5,345,710 | 9/1994 | Bitz . | |

Primary Examiner—Kurt Rowan
Attorney, Agent, or Firm—Cumpston & Shaw

[57] ABSTRACT

An animal trap comprising an elongated, U-shaped cage with a cover and vertically slideable doors at each end is disclosed. The trap further includes a triggering mechanism that results in the activation of at least one trap door when an animal removes bait from a bait tray. The triggering mechanism includes a vertical bait pin positioned above a hole in the bait tray, a flexible linking means connecting the bait pin to a latch pin that holds the trap door in an open position. When the bait is removed from between the bait tray and the lower end of the bait pin, the bait pin falls and accelerates through the hole in the bait tray creating tension in the flexible member which actuates the latch pin allowing the trap door to fall and lock in a closed position.

13 Claims, 5 Drawing Sheets

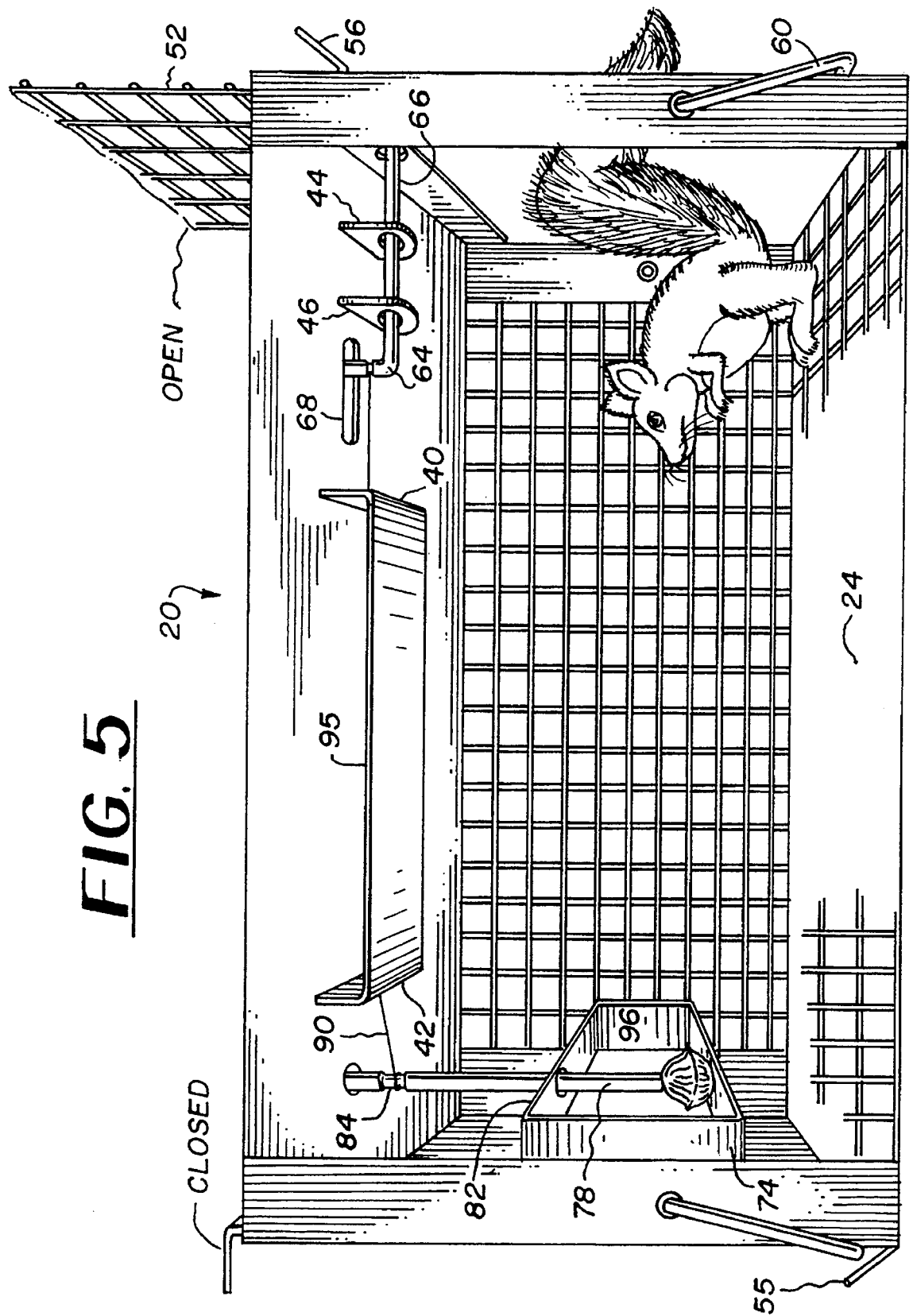

ANIMAL TRAP

FIELD OF THE INVENTION

This invention relates to humane animal traps and more specifically to a humane animal trap having novel and reliable triggering and locking mechanisms.

BACKGROUND OF THE INVENTION

Humane animal traps are well-known and generally include a trap housing and at least one door which in an open position allows an animal to enter the trap housing and in a closed position prevents the animal from exiting the trap. Many triggering mechanisms are disclosed in the prior art and they generally rely on gravity to move the trap door from the open position to the closed position, although a spring-held mechanism had been disclosed in U.S. Pat. Nos. 1,892,423 and 2,524,504. Generally, trap housings are produced in various sizes to accommodate the size of the animal to be trapped.

Several problems are encountered with the humane animal traps of the prior art. Many triggering mechanisms are complicated and therefore difficult and expensive to manufacture. Many are difficult to set and unreliable in operation.

An object of the present invention is the provision of an improved humane animal trap having improved triggering and locking mechanisms. A further object of the present invention is to provide simple and reliable triggering and locking mechanisms that can be set indoors, away from adverse weather conditions, and transported in a set configuration with minimal risk of activating the triggering mechanism in transit. A further object of the present invention is the provision of a trap which is economical to manufacture and efficient in operation.

SUMMARY OF THE INVENTION

Briefly stated the present invention is for an animal trap comprising an elongated, housing with a horizontal base and two vertical sides, a substantially planar cover mounted between the tops of the vertical sides of the housing, slideably mounted doors within slots at each end of the housing with a locking mechanism for locking each door in a closed position and a triggering mechanism. The triggering mechanism comprises a bait tray disposed between the vertical sides of the housing above the horizontal base, such tray containing a hole of sufficient diameter for allowing a bait pin to pass there through. A bait pin which can travel vertically between a set and triggered positions is disposed over the hole in the bait tray and holds a bait in position on the hole in the tray. Guides in the cover and between the vertical sides of the housing align the bait pin to ensure that when the bait is taken by an animal, the bait pin falls vertically through the hole and the bait tray. The bait pin is connected to a latch release mechanism by a flexible wire which is threaded through the wire guides attached to the inside of the cover of the housing.

When the bait is removed from between the bottom of the bait pin and the bait tray, the bait pin, by virtue of its own weight, falls and accelerates in a downward direction. After the slack in the flexible member is eliminated by the downward motion of the bait pin, the tension on the flexible member actuates the latch pin from its engagement with the trap door. Gravity causes the trap door to fall vertically within slots at the end of the housing and remain in the closed position by a locking mechanism.

The locking mechanism consists of a V-shaped groove or lip at the bottom of each slideable door and a swing lock pivotally attached to the end of the housing such that the swing lock engages the groove at the bottom of the door while in a closed position preventing vertical travel of the door. The force of the falling door causes the bottom of the V-shaped groove to strike the swing lock which then pivots up and away from the housing. Upon the swing lock's return to its resting position, the door has continued its vertical travel such that the swing lock will be disposed within the inside of the groove at the bottom edge of the door. The swing lock will prevent any upward travel of the trap door, keeping the animal inside the cage until the animal can be safely released at a different location.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

BRIEF DESCRIPTION OF THE DRAWINGS

FIG. 5 is a perspective view of the animal trap with the trap door open.

DETAILED DESCRIPTION OF THE PREFERRED EMBODIMENT

Figure 1:
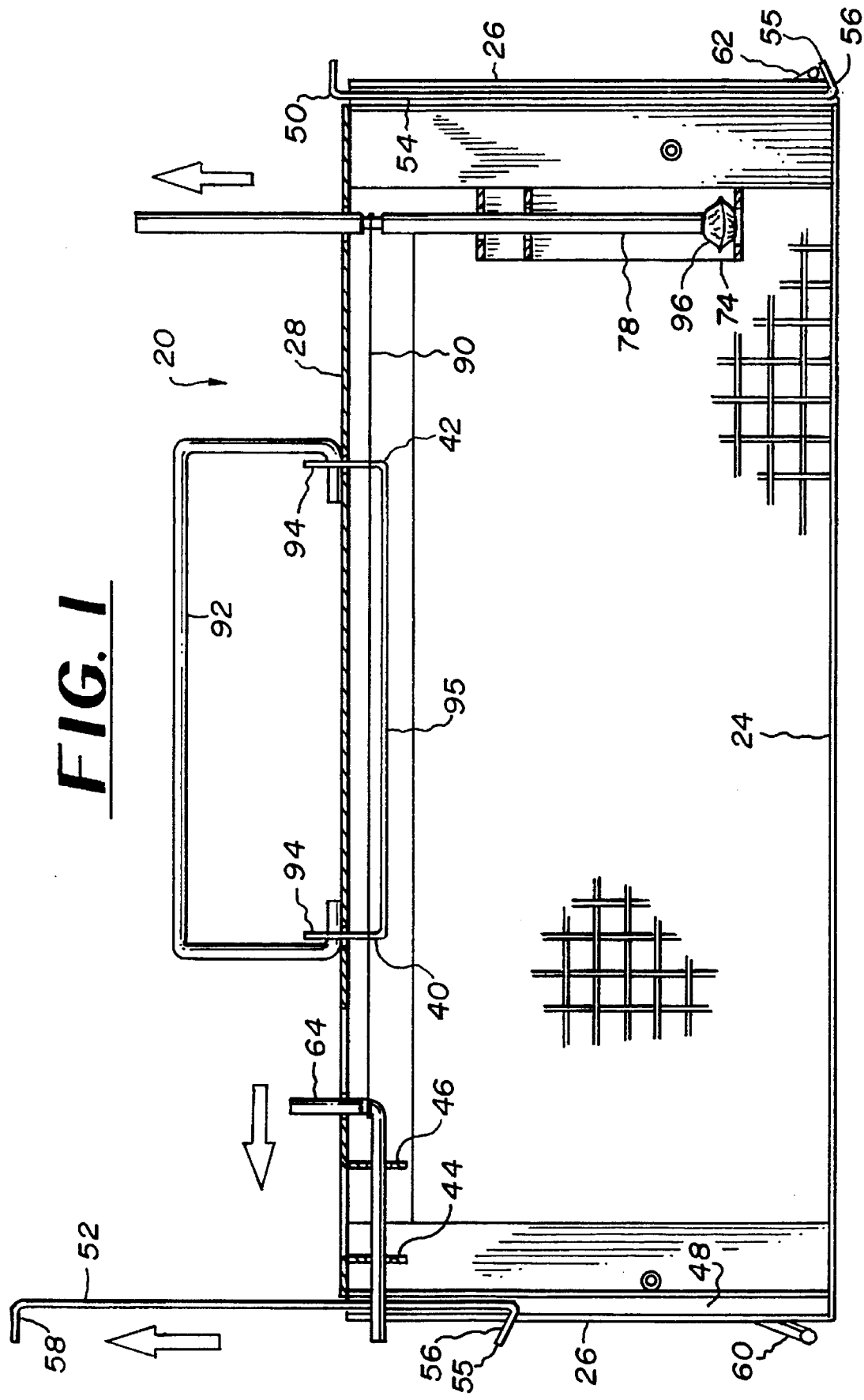
FIG. 1 is a side view of the animal trap with the trap door in the open position and the bait in place.
Figure 2:
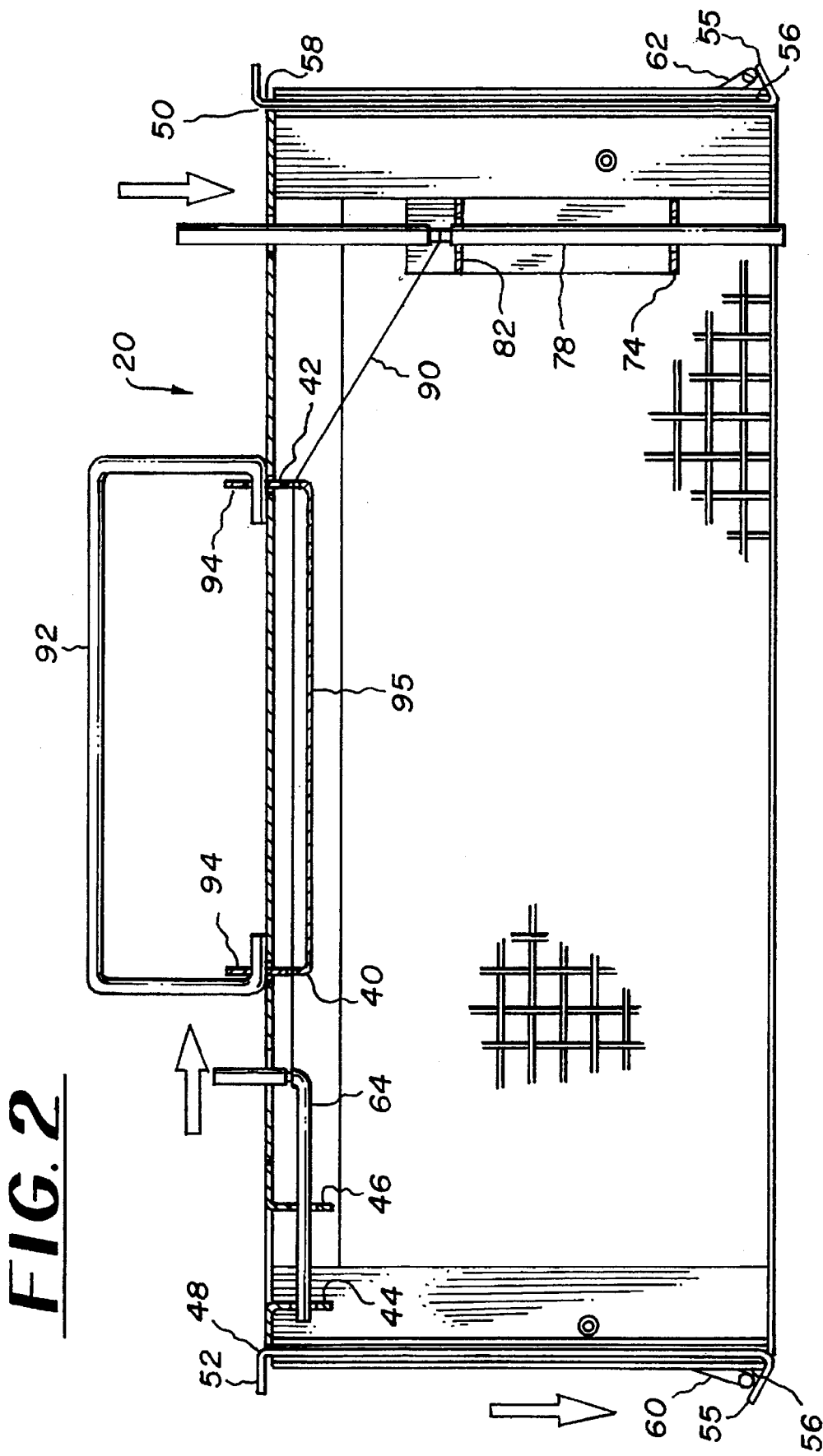
FIG. 2 is a side view of the animal trap with the trap door in the closed position.
Figure 3:
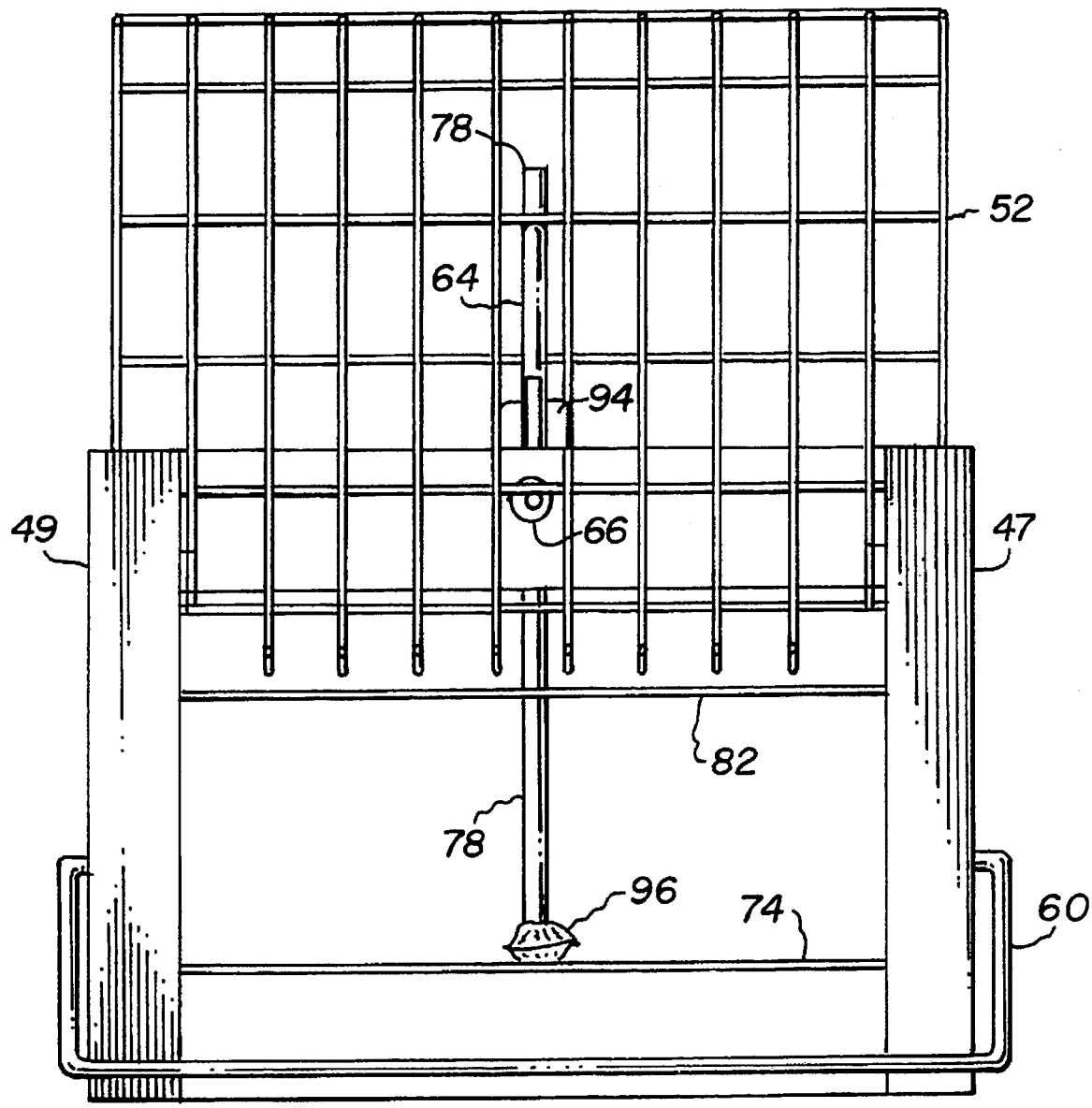
FIG. 3 is an end view of the animal trap with the trap door in the open position.
Figure 4:
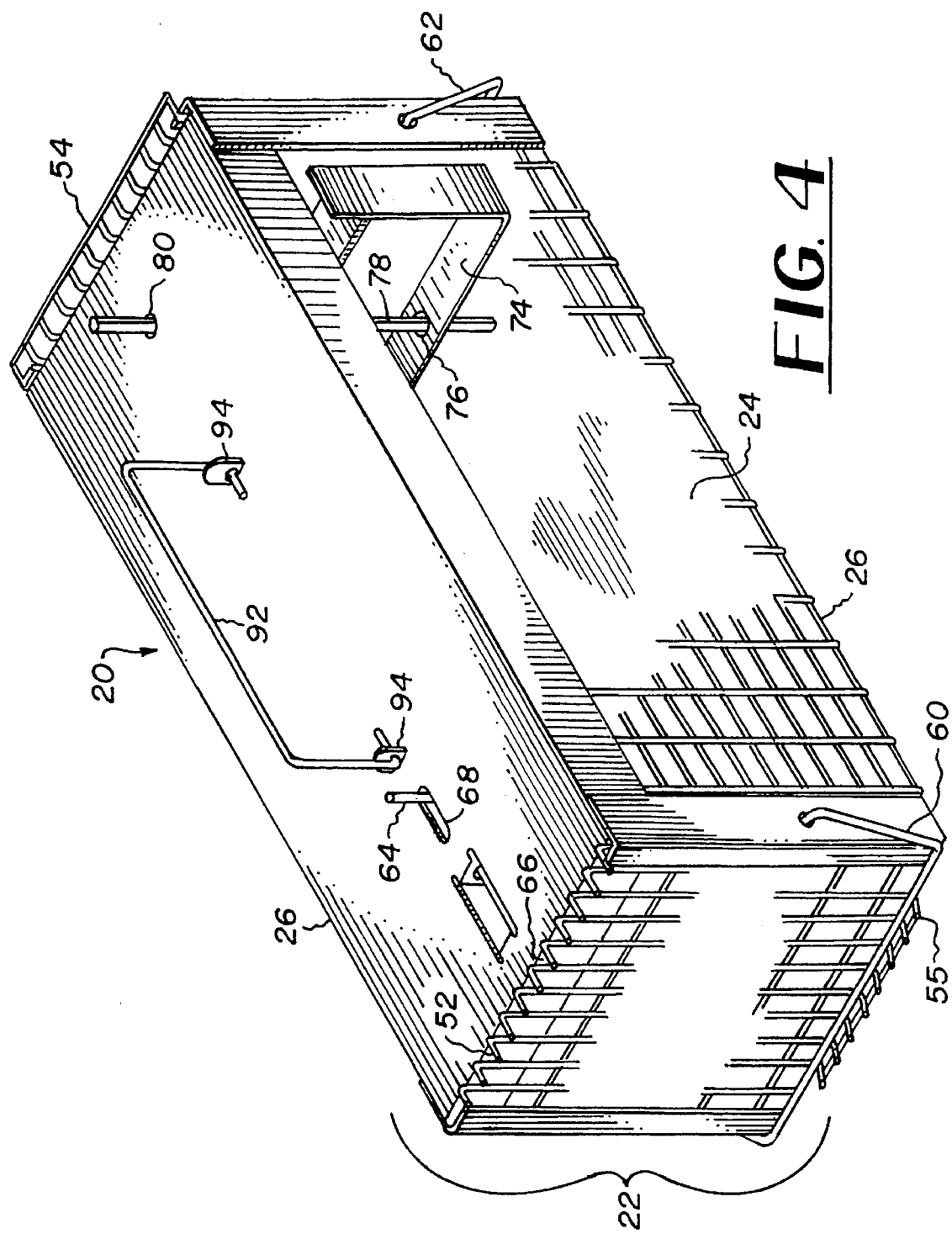
FIG. 4 is a perspective view of the animal trap with the trap door closed.

Referring to FIGS. 1–5, a humane animal trap according to the present invention is indicated. The trap 20 comprises an elongated, U-shaped housing 22 with a horizontal base 24 and two vertical sides 26. A preferably, but not necessarily, substantially planar cover 28 containing holes 68, 80 wire guides 40, 42 and the latch pin supports 44, 46 is supported between the top edges of the vertical sides of the housing. At each open end of the housing 22 are corner members 47, 49 forming vertical slots 48, 50 for receiving the slideably mounted doors 52, 54. Each door has bent up lower lip 55 portion to form a V-shaped groove 56 at its lower edge and a perpendicular bend 58 at its top edge to manually raise the door for setting the triggering mechanism or releasing a trapped animal. A swing lock 60, 62 is pivotally attached to the vertical sides of the housing and rests against the door slots slightly above the horizontal base. The sides, floor and doors of the trap are preferably formed with a an open mesh structure, for example, a wire mesh.

The trap door 52 is held in the open position by a latch pin 64 which is slideably mounted to the inside of the housing cover on guides 44 and 46 and passes through a hole 66 in the cover to engage an opening in the trap door for holding the trap door in a set open position. The latch pin 64 protrudes through a groove 68 in the cover 28 which permits the latch pin to be retracted from the engaged position to allow for vertical travel of the trap door in the setting and release operations.

Inside the housing near the end opposite the trap door, a bait tray 74 is disposed between the vertical sides of the housing above the horizontal base. The bait tray contains a hole 76 of sufficient diameter for receiving a bait pin 78, and yet small enough to prevent the bait from falling through the hole. The upper end of the bait pin protrudes through a hole 80 above the cover can be straight or can be L-shaped to reduce the overall height of the trap.

The bait pin, preferably, extends through hole 80 in the cover and through a bait pin guide 82 to maintain the alignments of the bait pin directly over the hole in the bait tray. The bait pin 78 is linked to the latch pin 64 by a flexible member 90 of string or wire. The flexible member connects to the bait pin at a position 84 such that when the bait pin is placed above the bait in the set position, the connecting point is substantially at the same level as the horizontal portion of the latch pin. The flexible member is threaded through wire guides 40, 42 attached to the inside of the cover which may be incorporated with a handle 92 or handle supports 94. In a preferred embodiment of the invention the wire guides are connected by a metal guard 95 which protects the flexible member from the trapped animal.

The trap is preferably set at the end opposite the trap door 52, and preferably through the opened door 54. The bait pin is lifted and suitable bait 96, such as a hickory nut, peanut or candy, is placed on the bait tray directly above the hole. The bait pin 78 is then lowered to rest on top of the bait. The weight of the bait pin securely holds the bait in place and reduces the chance of inadvertently activating the triggering mechanism. The door 54 to the baiting end of the trap can then be closed and secured by its swing lock 62.

The latch pin 64 is retracted by sliding the protruding end of the latch pin away from the trap door 52. The trap door can then be raised to the open or set position at which point the latch pin can be slid through hole 66 into its engaged position to hold the trap door open. The trap is now set and can be transported to its desired location with minimal risk of activating the triggering mechanism in normal handling.

When the bait is removed, for example, by an animal entering the trap, the weight of the bait pin causes it to fall and accelerate as it drops through the hole in the bait tray. As the slack in the flexible member is removed by the vertical travel of the bait pin, the flexible member will then actuate the latch pin releasing the trap door and allowing the trap door to fall under its own weight. The force of the accelerating bait pin is thus transmitted through the flexible member and is sufficient to overcome the inertia and friction of the bait pin in the set position.

As the outside of the V-shaped groove 56 at the lower edge of the door strikes the swing lock 60, the swing lock will rotate away from the slots at the end of the housing to allow for further travel of the trap door. As the swing lock rotates back towards the guides, the swing lock will fall inside the V-shaped groove at the lower edge of the trap door locking the trap door in its closed position.

Alternative latch release mechanisms for engaging the trap door to maintain the trap door in the open position and allow for entry of the animal to be trapped can be used. The latch can be any device which can be connected to the trap door and then be released by the falling bait pin, for example, a pivotable rod or hook, a spring loaded pin or clamp.

Although the animal trap described is of a size suitable for trapping small animals such as squirrels it should be recognized by those familiar with the art that the trap can be formed in smaller or larger sizes to accommodate the size of the animal to be trapped and by using appropriate bait.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. An animal trap comprising:
    a housing with a horizontal base and two vertical sides;
    a cover mounted between the vertical sides of the housing, said cover and said housing forming a box-shaped cage having at least one open end;
    a door slideably mounted at an open end of the cage and capable of vertical travel between an open and a closed positions;
    a means for locking the door in the closed position to prevent the escape of an animal after activating the trap; and
    a triggering mechanism comprising:
        a bait tray within the housing and above the base of the housing, such tray containing a hole;
        a bait pin capable of vertical travel between a set and a triggered positions and having two ends, the lower end of the bait pin having a diameter allowing it to pass through the hole and disposed above the hole in the bait tray and resting on a bait in the set position, the bait disposed between the lower end of the bait pin and the bait tray hole, and the lower end of the bait pin protruding through the hole in the bait tray in the triggered position;
        a latch moveable between a set and triggered positions such that in the set position the latch holds the door covering that end of the cage in the open position; and
        a connecting means disposed between the latch and the bait pin and connected to the bait pin for releasing the latch when the bait pin moves from the set position to the triggered position.

2. The animal trap according to claim 1, further comprising a locking mechanism, the locking mechanism comprising a lip at the end of the door which protrudes up and away from the housing and forms an acute angle with the vertical plane of the door and a swing lock pivotally attached to the housing such that the swing lock engages the lip of the door while in the closed position preventing vertical movement of the door.

3. The animal trap according to claim 1, wherein said connecting means of the triggering mechanism comprises a flexible member connected between the latch and the bait pin, and a guide connected to the inside of the cover between the latch and the bait pin and through which said flexible member passes.

4. The animal trap according to claim 3, wherein said flexible member has a length such that when the bait is removed from between the lower end of the bait pin and the bait tray the weight of the bait pin causes the bait pin to accelerate as it falls so that the force of the accelerating bait pin is transmitted through the flexible member and is sufficient to release the latch from the set position.

5. The animal trap according to claim 1, wherein the bait tray is disposed between the vertical sides of the housing.

6. The animal trap according to claim 1, wherein the bait tray is located at an opposite end of the trap from the door.

7. The animal trap according to claim 6, further comprising a door slideably mounted at an opposite end of the cage from the latchable door and capable of vertical travel between the open and closed positions for enabling loading of the bait.

8. The animal trap according to claim 1, wherein the cover has a hole of sufficient diameter for allowing the bait pin to pass there through.

9. The animal trap according to claim 1, wherein the latch comprises a pin having two ends slideably mounted to the inside of the cover on a guide, one end of the latch pin protruding through an opening in the door to hold the door at that end of the cage in the open position.

10. An animal trap triggering mechanism comprising:

a bait tray disposed above a base of the animal trap, said bait tray containing a hole of sufficient diameter for receiving a bait pin;

a bait pin capable of vertical travel between a set and a triggered positions and having two ends, the lower end of the bait pin disposed above the hole in the bait tray and resting on a bait in the set position and protruding through the hole in the bait tray in the triggered position;

a latch moveable between a set and triggered positions such that in the set position the latch holds a trap door in a open position; and a connecting means disposed between the latch and the bait pin and connected to the bait pin so that when the bait pin moves to the triggered position the connecting means releases the latch.

11. The animal trap triggering mechanism according to claim 10, wherein said connecting means of the triggering mechanism comprises a flexible member connected between the latch and the bait pin, and a guide connected to the trap between the latch and the bait pin and through which said flexible member passes.

12. The animal trap triggering mechanism according to claim 11, wherein said flexible member has a length such that when the bait is removed from between the lower end of the bait pin and the bait tray the weight of the bait pin causes the bait pin to accelerate as it falls so that the force of the accelerating bait pin is transmitted through the flexible member and is sufficient to release the latch from the set position.

13. The animal trap triggering mechanism according to claim 10, wherein the latch comprises a pin having two ends slideably mounted on a pin guide, one end of the latch pin protruding through an opening in the trap door to hold it in the open position.

* * * * *